(12) United States Patent
Golubev et al.

(10) Patent No.: US 9,740,692 B2
(45) Date of Patent: *Aug. 22, 2017

(54) CREATING FLEXIBLE STRUCTURE DESCRIPTIONS OF DOCUMENTS WITH REPETITIVE NON-REGULAR STRUCTURES

(71) Applicant: ABBYY Development LLC, Moscow (RU)

(72) Inventors: Sergei Golubev, Moscow (RU); Irene Filimonova, Moscow (RU); Sergey Zlobin, Moscow (RU)

(73) Assignee: ABBYY Development LLC (RU)

( * ) Notice: Subject to any disclaimer, the term of this patent is extended or adjusted under 35 U.S.C. 154(b) by 171 days.

This patent is subject to a terminal disclaimer.

(21) Appl. No.: 14/533,530

(22) Filed: Nov. 5, 2014

(65) Prior Publication Data

US 2015/0058374 A1 Feb. 26, 2015

Related U.S. Application Data

(63) Continuation-in-part of application No. 13/562,791, filed on Jul. 31, 2012, now Pat. No. 8,908,969, which (Continued)

(30) Foreign Application Priority Data

Dec. 20, 2013 (RU) ................ 2013156782

(51) Int. Cl.
*G06K 9/54* (2006.01)
*G06F 17/30* (2006.01)
*G06K 9/00* (2006.01)
*G06K 9/20* (2006.01)

(52) U.S. Cl.
CPC .. *G06F 17/30011* (2013.01); *G06F 17/30321* (2013.01); *G06K 9/00469* (2013.01); (Continued)

(58) Field of Classification Search
CPC ........... G06F 17/3011; G06F 17/30321; G06K 9/2072; G06K 9/00469; G06K 2209/01; (Continued)

(56) References Cited

U.S. PATENT DOCUMENTS 5,025,484 A 6/1991 Yamanari et al.
5,182,656 A 1/1993 Chevion et al.
(Continued)

FOREIGN PATENT DOCUMENTS

EP 1659526 A1 5/2006

*Primary Examiner* — Sheela C Chawan
(74) *Attorney, Agent, or Firm* — Veronica Weinstein

(57) ABSTRACT

Disclosed are systems, computer-readable mediums, and methods for creating a flexible structure description. To create the flexible structure description an image of a document of a particular document type that contains a table is received. An entry describing an item in the table is received. Title elements within the document are searched for based upon the entry. Data fields and anchor elements are detected for the entry. A flexible structure description for the particular document type is generated that includes a set of search elements for each data field in the image of the document and the title elements. The flexible structure description is matched against the image. Data from the image is extracted based upon the matching of the flexible structure description against the image.

20 Claims, 4 Drawing Sheets

Related U.S. Application Data is a continuation of application No. 12/364,266, filed on Feb. 2, 2009, now Pat. No. 8,233,714, which is a continuation-in-part of application No. 11/461,449, filed on Aug. 1, 2006, now abandoned.

(52) U.S. Cl.
 CPC ....... *G06K 9/2072* (2013.01); *G06K 2209/01* (2013.01); *Y10S 707/99933* (2013.01)

(58) Field of Classification Search
 CPC ........ G06K 9/00; G06K 9/2054; G06K 9/222; Y10S 707/99933
 USPC .............. 382/180, 181, 305; 707/999.1, 999, 707/999.004, 999.102, 999.003, 999.001, 707/999.202, 999.006, 999.002, 999.104, 707/E7.127, E7.061, E7.101, E17.059, 707/709, 769, 736, 705, 758; 357/E7.133, E7.15, E7.163; 348/E7.013, 348/E7.016; 715/207, 234; 365/158, 365/171; 725/53, 135; 709/206
 See application file for complete search history.

(56) References Cited

U.S. PATENT DOCUMENTS

| | | | |
|---|---|---|---|
| 5,191,525 A | 3/1993 | LeBrun et al. | |
| 5,235,654 A | 8/1993 | Anderson et al. | |
| 5,257,328 A | 10/1993 | Shimizu | |
| 5,416,849 A | 5/1995 | Huang | |
| 5,721,940 A | 2/1998 | Luther et al. | |
| 5,748,809 A | 5/1998 | Hirsch | |
| 5,793,887 A | 8/1998 | Zlotnick | |
| 5,822,454 A | 10/1998 | Rangarajan | |
| 5,864,629 A | 1/1999 | Wustmann | |
| 6,507,671 B1 | 1/2003 | Kagan et al. | |
| 6,640,009 B2 | 10/2003 | Zlotnick et al. | |
| 6,760,490 B1 | 7/2004 | Zlotnick et al. | |
| 6,778,703 B1 | 8/2004 | Zlotnick | |
| 7,046,848 B1 | 5/2006 | Olcott | |
| 7,149,347 B1 | 12/2006 | Wnek | |
| 7,416,131 B2 | 8/2008 | Fortune et al. | |
| 7,561,734 B1 | 7/2009 | Wnek | |
| 7,764,830 B1 | 7/2010 | Wnek | |
| 7,809,615 B2 | 10/2010 | Hui et al. | |
| 7,916,972 B2 | 3/2011 | Meunier et al. | |
| 8,233,714 B2 * | 7/2012 | Zuev | G06K 9/00469 382/180 |
| 2002/0106128 A1 | 8/2002 | Zlotnick | |
| 2004/0264774 A1 | 12/2004 | Anisimovich et al. | |
| 2007/0076984 A1 | 4/2007 | Takahashi et al. | |
| 2007/0255859 A1 | 11/2007 | Sasaki et al. | |
| 2008/0025618 A1 | 1/2008 | Minagawa et al. | |
| 2008/0205742 A1 | 8/2008 | Lund | |
| 2010/0128922 A1 | 5/2010 | Navon et al. | |

* cited by examiner

AnyFirm

Fahrzeug-Werke AG
Postcode 102654
44158 Bochum

ZRP 2 5. AUG. 2008

| No. | : | 0017/380452871 |
| Customer-No. | : | 115936 |
| Date | : | 08/21/2008 |
| Delivery Date | : | 08/20/2008 |
| Your ID | : | US124708110 |
| Our ID | : | DE103052273 |
| Pages | : | 1 to 15 |

```
Your Order / Your Mark            dated: 08/19/2008
19072                    Luckemeier
  Luckemeier
Internal Mark                  Telephone      Telefax
xxxxx DB-VP                    0735/161-0
Shipping Instructions
60 Contractor
ZE Free                        GROSS          171,3 KG
```

```
POS     ......ARTICLE-Nr.       ......AMOUNT    .UNIT PRICE    MWST
        DESCRIPTION / DIMENSIONS               ...POS.-COST   NETTO IN EUR

From Order/Delivery Note   2380263 / 5086607 / 19081

0010  A.457.130.38.15         1 ST       3.245,00
      LU AIRPRESSER                      3.245,00      2.174,15
                              33,000- %  1.070,85-
      Material Number:        25025308
                              0350    DE  020

Net Weight:             32,5  KG

0020  A.628.320.10.89         3 ST       120,50
      ZB ACTUATING BAR / VAO VO 45 LI
                                         361,50       213,28
                              41,000- %  148,22-
      Material Number:        23333100
                              0350    DE  030

Net Weight:             1,280 KG

Subtotal:    2.387,43
```

*Fig. 2A*

AnyFirm

Page: 14 / 15

Customer-No.: 115936   No.: 380452871   21.08.2008

| POS | ........ARTICLE-Nr.<br>DESCRIPTION / DIMENSIONS | ........AMOUNT | UNIT PRICE<br>...POS.-COST | MWST<br>NETTO IN EUR |
|---|---|---|---|---|
| | | Subtotal: | | 8.894,53 |
| 0690 | A.001.811.45.33<br>MIRROR GLASS<br>Material Number:<br>Net Weight: | 1 ST<br>41,000- %<br>14374185<br>0350    DE<br>0,800 KG | 59,10<br>59,10<br>24,23-<br>030 | 34,87 |

From Order/Delivery Note  23792355 / 27644806 / 05081

| 0700 | A.357.429.00.35<br>BRAKE HOSE<br>Material Number:<br>Net Weight: | 2 ST<br>33,000- %<br>23554382<br>0350   PL<br>0,260 KG | 79,80<br>159,60<br>52,67-<br>020 | 106,93 |

```
                                GOOD VALUE         9.036,33
Output Tax         19,000 % of   9.036,33          1.716,90
Total                                             10.753,23
                                                ==============

Discount Group   Gross       Discount       Netto
020              8.873,75    2.928,42-      5.945,33
030              5.051,10    2.070,96-      2.980,14
003                 95,60        9,56-         86,04
026                 39,40       14,58-         24,82
                14.059,85    5.023,52-      9.036,33
```

******************************************************

OUR COMMON TERMS AND CONDITIONS APPLY.

BELEG
0 1. SEP. 2008
SCANNED

*Fig. 2B*

CREATING FLEXIBLE STRUCTURE DESCRIPTIONS OF DOCUMENTS WITH REPETITIVE NON-REGULAR STRUCTURES

CROSS REFERENCE TO RELATED APPLICATIONS

This application is a continuation-in-part of U.S. patent application Ser. No. 13/562,791, filed Jul. 31, 2012 which is a continuation of U.S. patent application Ser. No. 12/364,266, filed Feb. 2, 2009, now U.S. Pat. No. 8,233,714, issued Jul. 31, 2012 which is a continuation-in-part of U.S. patent application Ser. No. 11/461,449, filed Aug. 1, 2006, now abandoned. This application also claims the benefit of priority under 35 USC 119 to Russian Patent Application No. 2013156782, filed Dec. 20, 2013; the disclosures of the priority applications are incorporated herein by reference.

BACKGROUND

Data capture systems are used to extract data from paper documents or from images created from such documents. A typical data capture system consists of an imaging device that acquires the image of the document and software that runs on a computer that processes the acquired image.

Typically, data from paper documents are captured and entered into a computer system by a data capture system, which converts paper documents into electronic form (by scanning or photographing documents) and then extracts data from document fields within the document for storage, analysis, and further processing. These paper documents may have varying structures.

A structured document is a fixed or flexible form with one or more pages to be filled out by a human, either manually or using a printing device. Typically, a form has fields to be completed with an inscription next to each field stating the nature of the data the field should contain.

A fixed form has the same positioning and number of fields on all of its copies (instances) and often has anchor elements (e.g. black squares or separator lines), whereas a flexible, or semi-structured form may have different number of fields which may be positioned differently from copy to copy.

Examples of flexible forms include application forms, invoices, insurance forms, money order forms, business letters, receipts, tax return forms, etc. For example, invoices will often have different numbers of fields located differently, as they are issued by different companies. Further, common fields e.g. an invoice number and total amount may be found on all invoices, even though they may be placed differently.

To process structured documents, a data capture system should be provided with information about such fields. The information may include the position of the fields in relation to page boundaries or other objects, properties of the data, validation rules, etc. Advantageously, if the number of documents to be processed is large, automated data and document capture systems can to be used.

For efficient data capture of flexible forms, the data capture system has to be trained in advance to detect the useful data fields on documents of the various types that the system will handle. As a result, the system can detect the required fields and extract data from them automatically. A highly skilled expert is required to train the system to detect the necessary data fields on documents of a given type. The training is done in a dedicated editing application and is very labor-intensive.

Many documents, for example, phone bills, invoices, questionnaires or registration forms are multi-page documents in that they have more than one page. Very often information contained in one-page or multi-page documents may contain repetitive structures (e.g. repetitive fields or groups of fields). In other words it consists of multiple groups of data having identical structures—for example, each group of fields may have a subheading, a table fragment, a subtotal, or a caption for the table fragment. The number and size of groups may vary from document to document of the given type and, consequently, the number of pages may also vary.

Multi-page document may have tables with complex and non-regular structure, which cannot be recognized by common method of detecting rows and columns or by detecting table cells.

SUMMARY

Disclosed are systems, computer-readable mediums, and methods for creating a flexible structure description. To create the flexible structure description an image of a document of a particular document type that contains a table is received. An entry describing an item in the table is received. Title elements within the document are searched for based upon the entry. Data fields and anchor elements are detected for the entry. A flexible structure description for the particular document type is generated that includes a set of search elements for each data field in the image of the document and the title elements. The flexible structure description is matched against the image. Data from the image is extracted based upon the matching of the flexible structure description against the image. Other implementations of this aspect include corresponding systems, apparatuses, and computer-readable media configured to perform the actions of the method.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

FIG. 2A shows a first page of a multi-page document that has a non-regular structure in accordance with one embodiment.

FIG. 2B shows a second page of the multi-page document that has a non-regular structure in accordance with one embodiment.

Figure 1:
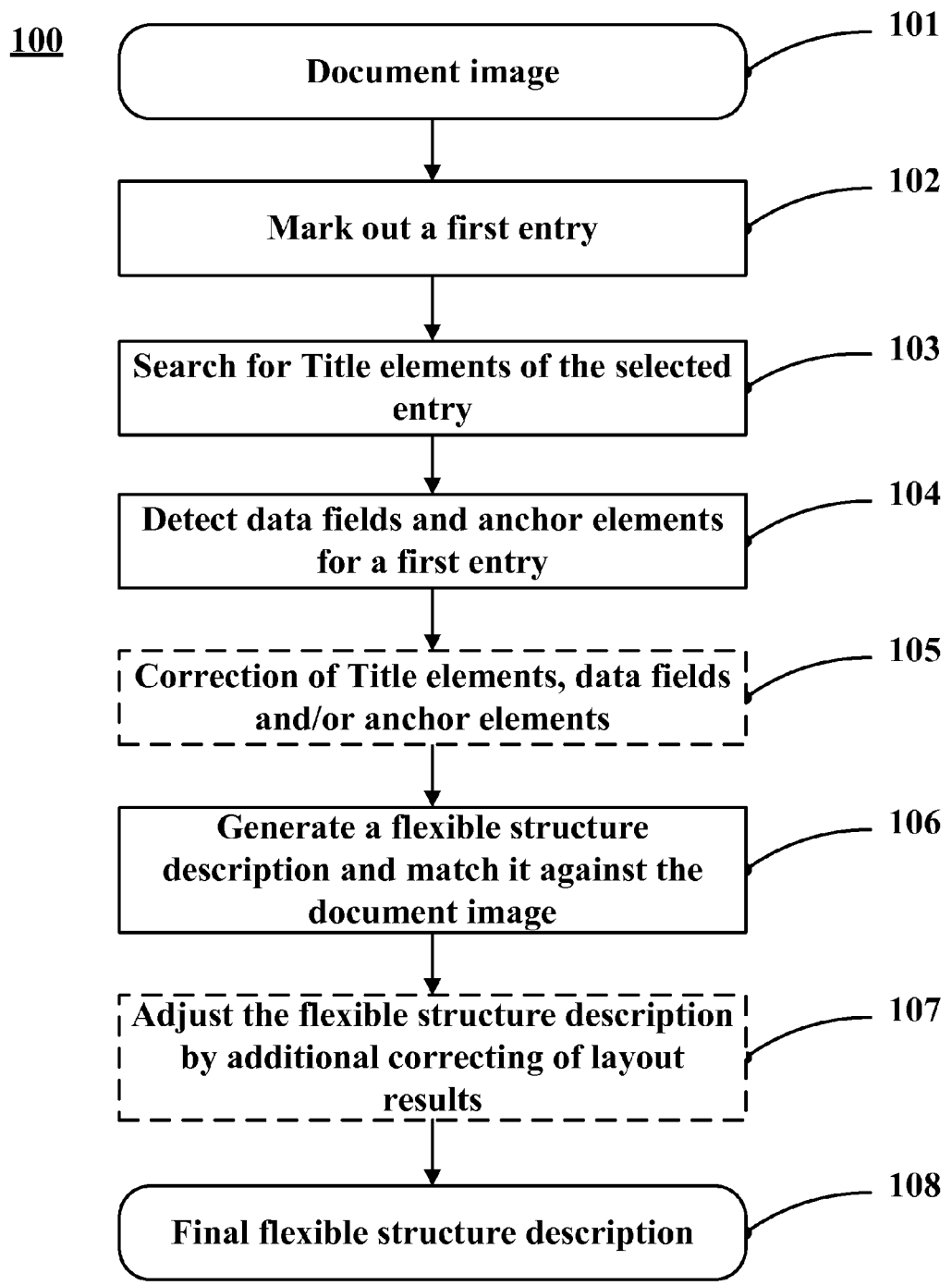
FIG. 1 shows a flowchart of operations for generating a flexible structure description in accordance with one embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Implementations of various disclosed embodiments relate to data capture by means of optical character recognition of forms, and specifically to autocreating and autotraining a structure description for capturing data from a document image.

Described embodiments disclose capturing data from a document image of one or more pages. A flexible structure description is automatically created and trained for a semi-structured document during data capture, without prior set-up of a field detection algorithm. The one-page or multi-page document, from which the document image is acquired (e.g. scanned), may include a plurality of repetitive structures. Repetitive in this context means that similar or identical structures are encountered in the document (and hence document image) at least twice.

The term "document" as used herein is to be interpreted broadly to include different flexible forms or documents of non-fixed format and the like.

Also described are data capture systems capable of implementing the inventive method. In one embodiment, the system for capturing data from a document image comprises an imaging device connected to a computer with a specially designed data capture software application based on OCR/ICR. In one embodiment, the data capture system may be implemented using the hardware platform described herein with reference to FIG. 3 of the drawings.

Specially prepared flexible structure descriptions may be used to capture data from paper documents. A flexible structure description comprises fields, elements, and relationships among them. A field (or data field) identifies an area on the image from which data are to be extracted and the type of data that this area may contain. The positions of the fields are usually detected based on reference elements, or anchors. An anchor corresponds to one or more pre-defined image elements (e.g. separator line, unchangeable text, picture, etc.) relative to which the positions of other elements are specified. For example, the text "Invoice No." or "Total CHF" can be used as an anchor relative to which the respective fields can be detected.

A flexible structure description also comprises an algorithm for detecting fields on semi-structured documents. Flexible structure descriptions are created by human experts and may be loaded into a data capture system to be automatically matched against incoming documents.

Advantageously, the method allows training and "extra training" a flexible structure description to make it suitable for a new document type without enlisting the services of an expert, and makes the creation of a flexible structure description by an expert easier whenever a completely automated creation of a flexible structure description is impossible (for example, when processing images of very poor quality).

In one embodiment, the method can be used for creating a flexible structure description. In the case of a new semi-structured document completely unknown to the system, which may contain one or more pages, the first step is to select on the entire document image certain image objects of predefined types (separator line, bar code, check mark, picture, separate word, line of words, paragraph, etc.). To enable this selection step, in one embodiment, the system is provided with information about the data fields from which information has to be captured into a database and about the anchor elements which help to detect the data fields. The information about the data fields may be user (operator) input. Each anchor element enables detection of a data field based its position relative to the anchor element, as will be described.

A field's region may enclose one or more previously selected image objects of check mark, bar code or text types. Once a field is specified, the system automatically recognizes the text objects or bar codes inside this field. Additionally, the system recognizes the text lines in the vicinity of the field, which may contain the name of the field or additional information about the field. If the field contains text, the system automatically identifies a data type corresponding to this text based on predefined data types. In one embodiment, the predefined data types may include date, time, number, currency, phone number, a string of predefined characters, a regular expression, and a string of several fixed combinations.

The system automatically creates a new flexible structure description or "structure description" which corresponds to certain document type given the detected fields. For each field, a search element or set of search elements is created in the structure description. The search elements are to be used by a search algorithm to detect the field and indicate type of data in the field, refer to anchor elements, etc. The set of predefined types of field data may include: Static Text, Separator, White Gap, Barcode, Character String, Paragraph, Picture, Phone, Date, Time, Currency, Logo, Group, Table, Repeating Item, and others. Additionally, various auxiliary elements may be added to the set. The system establishes the location of the data field relative to these elements.

For example, in one implementation, if, in the vicinity of the data field, the system detects a string whose position and text content suggest that it may contain the name of the field or additional information about the field, the system adds to the set of elements an element of type Static Text, which specifies the search criteria for this text string. The hypothesis will be tested later when several more documents of this type are fed to the system. If this string is reliably detected in the vicinity of the same field on the majority of the other images, the hypothesis is deemed to be the right one. Besides, the hypothesis may be confirmed or refuted by an operator of the data capture system, and the Static Text element can be deleted from the set of elements describing the data field.

The created structure description may be trained by matching against some more documents, and correcting errors and mismatches by user. The system adjusts the set of search constraints in the structure description so that they do not come into conflict with the fields pointed out by the user. At the same time, alternative search areas may be added for an element, offsets for "above," "below," "left of," and "right of" relationships may be adjusted, unreliable anchor elements may be removed, and new anchor elements may be added. Besides, several alternative search elements may be created for a field, which the system will search consecutively.

The adjustments are used for training the structure description. During the training, the system assesses how reliably search elements are detected and makes changes to their make-up and search criteria. The adjusted structure description is matched both against problem pages (to make sure that the error has been corrected) and against the other pages (to make sure that the corrections have not affected the detection of elements elsewhere).

The system allows specifying an unlimited number of auxiliary anchor elements in each set of elements describing a field. The system may be provided with information about the position of auxiliary image objects, in which case the system will automatically create elements of the corresponding types and specify their search criteria. A flexible or semi-structured document may have no names for some or even all of its fields, in which case they are detected using other anchor elements.

An element's search criteria include the type of the image object to detect, its physical properties, its search area, and its spatial relationships with other, already described elements. For example, to find an amount on an image of an invoice, the user may create an element of type Currency with the following properties: likely currency names ($, USD, EUR, GBP, RUB, etc.); likely decimal separators (, .); position of currency name relative to the amount (before the amount, after the amount), etc. An important feature of the method is the ability to specify the physical properties of elements of any type through allowed ranges of values. For example, the user may specify the minimum and maximum lengths and widths of a separator line, possible letter combinations in a keyword, possible alphabets for a character string, etc. Thus, for one and the same field or element, a broad range of alternatives can be specified, which reflects variation typical in semi-structured documents.

Additionally, element properties include parameters for handling possible image distortions which may occur when converting documents into electronic format (e.g. when scanning or photographing a document). For example, the user may allow for a certain percentage of OCR errors in keywords (elements of type Static Text), separator lines may have breaks of certain absolute or relative lengths, and white spaces (elements of type White Gap) may have a certain small amount of noise objects that may be introduced during scanning. These parameters are set by the system automatically and may be adjusted by the operator if required.

The search area of any element in the structure description may be created using any of the following methods or a combination thereof: by specifying absolute search constraints by means of a set of rectangles with specified coordinates; by specifying constraints relative to the edges of the image; and by specifying constraints relative to previously described elements.

An example of absolute constraints using a set of rectangles with user-specified coordinates: search in rectangles [0 inch, 1.2 inch, 5 inch, 3 inch], [2 inch, 0.5 inch, 6 inch, 5.3 inch]. An example of search constraints relative to the edges of the image: search below ⅓ of the height of the image, to the right of the middle of the image. An example of search constraints relative to another element: search below the bottom border of RefElement1 starting at the level 5 dots below border (i.e. with an offset of 5 dots); search to the left of the center of the rectangle that encloses Ref Element2 starting 1 cm to the left of the center (i.e. with an offset of 1 cm). When using a combination of methods to specify a search area, the resulting area is calculated as the intersection of all the areas specified by each method.

The system automatically generates search constraints for an element which are to be specified relative to some other elements. In order to generate relative search constraints automatically, the system consecutively examines several images of the same document type and selects constraints under which the required "above," "below," "left of," and "right of" conditions and offsets are met on all of the images. Offset values are also selected automatically so that the search criteria can be met on all of the above. If the position of the anchor element relative to the field varies from document to document, the search constraint is specified as follows: e.g. "either above RefElement1 by 3 inches or below RefElement1 by 5 inches." Thus formulates, the condition specifies alternative search areas for one and the same element.

Absolute constraints on an element's search area and constraints relative to the image edges are not obligatory and can be specified by an operator if there are no reliable anchor elements on the image. To be reliable, an anchor element must occur on the majority of documents of the given type.

An important feature of the method is the ability to use the search constraints that are based on the mutual positioning of elements even if some of these elements have not been detected on the image. The system may fail to detect an element either because the corresponding image object is physically absent on the image as a result of the document's semi-structured nature, or because the image object was lost or distorted during scanning. If an element is not detected, the system uses its specified search area when establishing mutual spatial relationships among this non-detected element and other elements.

Thus, whenever a new kind of document is fed into the data capture system, it automatically generates a preliminary flexible document description which already contains a search algorithm to be used to detect all the data fields indicated by the user.

Additionally, the system may attempt to detect image objects (titles, logos) whose position and physical properties may potentially be used to distinguish this type of document from other types. For this purpose, the system examines the objects at the very top of the document, looking for text lines whose height is significantly greater than the average height of the body text characters and for text lines in bold fonts. Additionally, the system looks for picture objects at the very top of the image which may be logos. For each line and picture detected in this manner, the system creates an element of the corresponding type (Static Text or Logo).

The hypothesis that these type-identifying elements can be reliably detected on other documents of this type is tested during extra training when some more documents are fed to the system. If the identifying elements created by the system cannot be found on all documents, the system uses the complete set of elements in the structure description to identify the document's type.

Two coordinate systems may be used—a local system of coordinates (bound to a particular page) and a global one (goes through the entire document). The only difference between the global and local coordinate systems is that the global system has parallel shifts, each page having its own shift. The global system of coordinates is very useful for documents, which may receive multi-page samples.

In case a document consists of more than one page, a multitude of all the pages of a document may be joined into one sheet termed hereinafter a multi-page sheet. A multi-page sheet is obtained by merging or joining together the pages of the document top down without any joints or gaps, and the left edges of all the pages are placed on the same axis that goes through the point (0,0). The sequence of the pages in the sheet depends on their order in a batch. For relations between elements, the global coordinate system is used, so that the relations, such as BELOW, are interpreted correctly even when elements are located at different pages.

Once the page images are joined into one multi-page sheet, the flexible structure description is applied to the entire sheet as if it were an image of a page. Next, the system tries to detect the data fields and extract the data. A recognition technique (e.g. Optical Character Recognition (OCR) or Intelligent Character Recognition (ICR)) may be used to recognize the data extracted from the fields.

A document, from which the document image is acquired (e.g. scanned), may include a plurality of repetitive structures. By repetitive is meant that similar or identical structures are encountered in the document (and hence document image) at least twice. The term "repetitive structure" includes a field or a group of fields. E.g. various tables have a repetitive structure.

Repetitive structure properties may be defined and include rules for processing data expected to be entered into a particular type of structure. These properties may include validation, verification, and export procedures to be followed when capturing data from a repetitive structure in the document image. Repetitive structure properties may also include an indication of whether a particular field within a repetitive structure is optional, an indication of whether a particular repetitive structure spans multiple pages in the image document, and the like.

Regardless of the exact nature of the repetitive structure properties, a method in accordance with an example embodiment comprises processing the document image to identify a plurality of repetitive structures and performing a capturing operation including creating a plurality of instances of the repetitive structure based on once-described structure properties of the repetitive structure in a flexible structure description, and populating each instance with corresponding data from the document image. An advantage of this may be that, because the repetitive structure properties are once-described, they can be applied uniformly to each repetitive structure, regardless of the number of repetitive structures. In fact, the exact number need not even be known in advance. Further, when creating a flexible structure description, it is not necessary to describe or define structure properties multiple times in order to apply the structure properties to multiple repetitive structures (further described below).

Properties of repetitive structures in a document, may further be used once, in accordance with an example embodiment, to describe:
- a single field or a group of fields that repeat themselves two or more times across at least one example of document of such type. For example, a group of fields, which may be repeated in a document, but there may be such document samples that contain only one presence of the group of fields;
- a particular row of a table if, this row has a complex structure. For example, a row may contain merged cells or may be located on more than one line (this is typical of wide tables where all columns do not fit on one line and are carried over to the next line);
- a column title of a multi-page table, if these column titles repetitively occur on at least two pages; and
- repetitive tables in which data creeps over to the next page(s) mid-table.

Each repetitive structure may have a plurality of structure properties associated therewith. The particular structure properties will depend on the nature of the structure. Repetitive structures will have the same once-described structure properties associated therewith, in accordance with an example embodiment.

Various tables or lists may be considered as repetitive structure elements. Repetitive structure properties may further include, among other things, the following:

type of data inside the structure, such as date, time, name, phone number, currency, address, number, static text, character string, paragraph, barcode, etc.;
rules that connect the contents of the structure to the contents of other structures or any other available data;
processing settings, such as recognition parameters, information about the layout of the structure, etc.

In general, in the case of a multi-page document, a particular repetitive structure may creep over from one page to the next, e.g. different fields within a group may be placed on different document pages. Also, any field (and any number of fields) within a repetitive group may be optional, e.g. they may be present within one group, but not within another group.

In some cases, repetitive groups may occur in a document in any order: left to right, top to bottom, bottom to top, or right to left. Moreover, the exact order may not be specified at all. Also, rectangles enclosing different repetitive group instances may intersect. However, individual fields within different repetitive group should preferably not intersect.

By way of development, it should be appreciated that there could be a repetitive structure nested within another repetitive structure. The properties of each repetitive structure are described or entered only once, regardless of a number of expected occurrences of that repetitive structure.

Repetitive groups may contain an arbitrary number of fields. In such cases, another repetitive group may be used as a separator. When such separating repetitive group is found, it is considered as a boundary for the abovementioned repetitive group with arbitrary number of fields. The nesting of repetitive groups is not necessarily limited in any way, because in the case of nested groups, a search is done from the innermost group towards outermost, and in each stage the same search approach can be used to find a repetitive group as for the case of plain, non-nested groups.

The setup of the data capture application is configured so that when a paper document is scanned or photographed, and a document image is produced which contains a plurality of repetitive structures, then the data capture application will selectively handle the data in each of the repetitive structures and will apply the same ones-described structure properties, optionally including validation, verification, and export procedures, to each instance of such data in their respective repetitive structures.

Some variants of semi-structured documents can have tables without separator lines or other row and/or column separators. Such tables can have a complex and non-regular structure. An example of a multi-page document that contains a table without separator lines is shown in FIGS. 2A and 2B. In some cases a row may contain merged cells or may be located on more than one line. For example, content 203 is spread over two lines. Columns located on two or more lines can be found in wide tables where all columns do not fit on one line and are carried over to the next line. Columns can even flow onto the next page. Content of different cells can also be very close to one another such that it is impossible to construct non-overlapping rectangles that enclose the different cells. For example, content 203 overlaps with content 206. Overlapping content can be found in invoices and lists of goods and services. In various embodiments, the data in non-regular structured tables can be found by describing a row (entry or item) as a repeating group.

To create a flexible structure description for a document with "repetitive structure," a user can mark out a first entry (row or item) (102) in a document image (101), FIG. 1. In cases when a repetitive structure (entry) is nested within another repetitive structure, the repetitive entry of the upper level (201, FIG. 2A) and the repetitive entry of the nested level (202) can be marked out specifying their relations.

In addition to marking out the first entry, a user can provide input indicative of the properties of the entry or properties of the structure. In some embodiments, the properties may be determined or generated automatically, or there can be some degree of automation. Properties of an entry or the structure can include one or more of validation and verification rules, export procedures, attributes of the structure, and so forth. User input can be received via a user interface including an input device. In some embodiments, the user can be prompted to provide the properties.

Documents can have one or more title elements above the entries that describe the entries' content, e.g. titles of table columns such as code number, name, article, price, sum, etc. Therefore the data capture system generates a hypothesis of title elements for the selected entry (row or item) (103). Searching for title elements can be performed above the marked entry. For example, FIG. 2A shows title elements 204 above the data in the table.

Title elements of table columns can be repeated at the top of each page that includes a table. So such title elements also can be considered as repetitive structure, which occurs one or more times per page. For example, the title elements can be repeated across multiple pages that include the table. For example, title elements 204 are repeated on a second page 221. Title elements do not have to be located at the top of a table. Title elements for other repetitive groups can be found at any part of a page, e.g. at the bottom of a table. For example, title element 205 "Subtotal" occurs at the bottom of each page excluding the final one and repeats at the top of next page 222 of the invoice. In the case of running title elements, the title elements interrupt the data contained in the table. For better confidence of the hypothesis of the title elements, the presence of the same titles on other pages (in case of multi-page document) can be confirmed. In addition, title elements can be searched in documents of the same document type. For example, invoices from the same organization (or company) can be searched for the title elements. In one embodiment, for capturing data from documents (e.g. invoices) of each company a special flexible structure description is created (i.e. one flexible structure description per company).

Using the title elements, the entry is divided into cells, wherein at least one data field and anchor element in the entry are detected (104). The rectangles enclosing cells may overlap. The hypothetical layout of table titles and the selected entry are suggested to a user. The user can correct (105) the detected title elements, data fields and anchor elements, or request another hypothesis to be generated. In some embodiments, the user can mark out an area for searching title elements. The searching area can then be searched for title elements as described above. The selected entry, data fields and anchor elements can also be detected or corrected manually.

Once the layout of table titles and the selected entry has been submitted, a flexible structure description can be generated on the base of the layouts. The system can automatically identify anchor elements or other auxiliary elements for searching data fields and create values of search parameters for each element and field; this information is entered the generated flexible description. The flexible description is matched against the whole document image trying to detect other entries of the table and the layout of new entries (106). In case of multi-page documents the title elements are searched for in others pages of the document. In one embodiment, the flexible structure description is a preliminary version. In this embodiment, results of the matching can be provided to a user. The user can correct any matching issues and the flexible description is adjusted accordingly (107). Once a sufficient quality of matching is achieved the flexible structure description can be saved and used by data capture system.

When matching repeating entries against a multi-page document it is appropriate to use a multi-page sheet representation of the document. The system takes into account the possible locations of entry instances, both on individual pages and in the document as a whole. During the search, the regions of already detected group (entry) instances can be removed from the search area of the next instances so that the different instances will not overlap. At the same time, the rectangles enclosing group instances may overlap. The search for instances of a repeating entry is deemed complete when the system cannot find any of the elements of the entry in the search area of the next instance.

The use of a multi-page sheet (global coordinate system) together with the images of individual pages (local coordinate system) makes it possible to solve tasks as complex as capturing data from documents with multi-page tables that have non-regular structures. Document 200 is an example of a document with a multi-page table with non-regular structures. FIG. 2A shows the first page of document 200, and FIG. 2B shows the last page (which is the $15^{th}$ page) of document 200. Describing the running title (title elements) as a repeating group which occurs once on each page enables the detection of the running title and remove the title elements from the table search area. A repeating group in the bottom of table of each page can also occur (205) and it can also be removed from the table search area. The information about the number, make-up, and order of columns in the table is used when going from one page to the next.

It should be taken in consideration that in some embodiments a document can have a front page (e.g. title page or cover sheet) or last page which does not contain the table, or for example the table may spread into 4 pages in 7-pages document, etc. In these cases the table entries can be searched in pages where the title elements are found. Usually in the end of tables in such documents as invoices, lists of goods, etc., the total sum can be represented. This information generally is very important for a user and can be captured. FIG. 2B shows a data field of total sum with anchor element "Total" (223) at the end of the table.

The user may correct the table layout detected at step 106, or select an area for other table entries search. Various user interface solutions can be suggested to simplify a user input. For example, the selected first entry can be expanded down covering the area for other table entries search. It is possible to point out those fields which have been detected incorrectly or not detected at all. Based upon this information, the system can correct (adjust) the flexible structure description (107). The updated flexible structure description can then be used to capture data.

The flexible structure description may be matched against multiple document images (other samples). The results of this matching can be corrected as needed. The flexible structure description is adjusted automatically after any data field, title element, and/or anchor element is corrected by a user (107). The system can automatically adjust search parameters for all elements and fields, add or delete anchor elements and other auxiliary elements for searching data fields, etc. The method of training flexible structure descriptions was mentioned above and described in detail in application Ser. No. 12/364,266. If a sufficient quality of matching is achieved, the flexible structure description may be considered ready (108). Such flexible structure description (108) is saved in system memory for further usage by the data capture system. For example, the flexible structure description is used to automatically extract data from various documents that contain a table associated with the flexible structure description.

Figure 3:
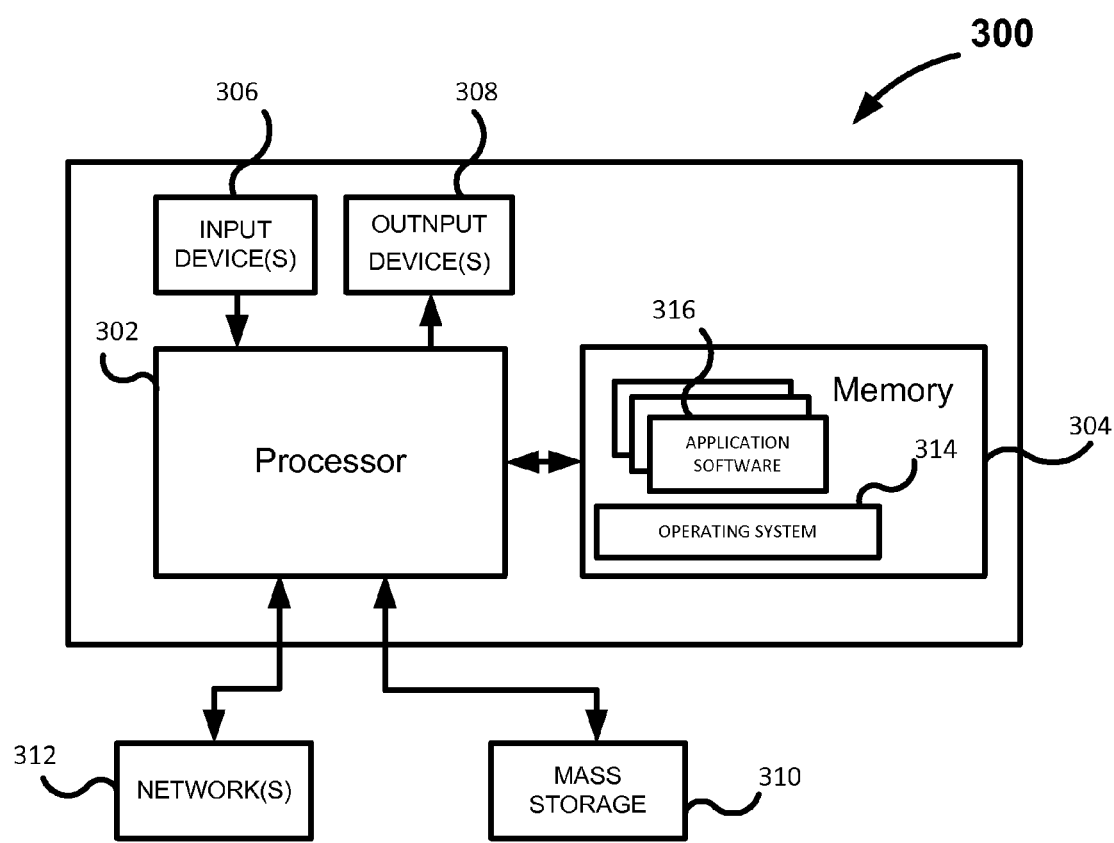
FIG. 3 shows hardware 300 that may be used to implement the techniques described herein.

FIG. 3 of the drawings shows an example of a system 300 for implementing the techniques disclosed herein. The system 300 may include at least one processor 302 coupled to a memory 304. The processor 302 may represent one or more processors (e.g., microprocessors), and the memory 304 may represent random access memory (RAM) devices comprising a main storage of the system 300, as well as any supplemental levels of memory e.g., cache memories, non-volatile or back-up memories (e.g. programmable or flash memories), read-only memories, etc. In addition, the memory 304 may be considered to include memory storage physically located elsewhere in the system 300, e.g. any cache memory in the processor 302 as well as any storage capacity used as a virtual memory, e.g., as stored on a mass storage device 310.

The system 300 also typically receives a number of inputs and outputs for communicating information externally. For interface with a user or operator, the system 300 may include one or more user input devices 306 (e.g., a keyboard, a mouse, imaging device, etc.) and one or more output devices 308 (e.g., a Liquid Crystal Display (LCD) panel, a sound playback device (speaker, etc.))

For additional storage, the system 300 may also include one or more mass storage devices 310, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the system 300 may include an interface with one or more networks 312 (e.g., a local area network (LAN), a wide area network (WAN), a wireless network, and/or the Internet among others) to permit the communication of information with other computers coupled to the networks. It should be appreciated that the system 300 typically includes suitable analog and/or digital interfaces between the processor 302 and each of the components 304, 306, 308, and 312 as is well known in the art.

The system 300 operates under the control of an operating system 314, and executes various computer software applications, components, programs, objects, modules, etc. to implement the techniques described above. Moreover, various applications, components, programs, objects, etc., collectively indicated by reference 316 in FIG. 3, may also execute on one or more processors in another computer coupled to the system 300 via a network 312, e.g. in a distributed computing environment, whereby the processing required to implement the functions of a computer program may be allocated to multiple computers over a network. The application software 316 may include a set of instructions which, when executed by the processor 302, causes the system 300 to implement the techniques disclosed herein.

Although the present disclosure has been described with reference to specific embodiments, it will be evident that various modifications and changes can be made to these embodiments without departing from the broader spirit of the disclosure. Accordingly, the specification and drawings are to be regarded in an illustrative sense rather than in a restrictive sense.

In general, the routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements of disclosed embodiments. Moreover, various embodiments have been described in the context of fully functioning computers and computer systems, those skilled in the art will appreciate that the various embodiments are capable of being distributed as a program product in a variety of forms, and that this applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks (DVDs), flash memory, etc.), among others. Another type of distribution may be implemented as Internet downloads.

In the above description numerous specific details are set forth for purposes of explanation. It will be apparent, however, to one skilled in the art that these specific details are merely examples. In other instances, structures and devices are shown only in block diagram form in order to avoid obscuring the teachings.

Reference in this specification to "one embodiment" or "an embodiment" means that a particular feature, structure, or characteristic described in connection with the embodiment is included in at least one embodiment. The appearance of the phrase "in one embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

While certain exemplary embodiments have been described and shown in the accompanying drawings, it is to be understood that such embodiments are merely illustrative and not restrictive of the disclosed embodiments and that these embodiments are not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

What is claimed is:

1. A method for creating a flexible structure description, the method comprising:
   receiving an image of a document of a particular document type that contains a table;
   receiving an entry describing an item in the table;
   searching for title elements based upon the entry;
   detecting data fields and anchor elements for the entry;
   generating, using a processor, a flexible structure description for the particular document type that includes a set of search elements for each data field in the image of the document and the title elements;
   matching the flexible structure description against the image; and extracting data from the image based upon the matching of the flexible structure description against the image.

2. The method of claim 1, further comprising adjusting, using the processor, the flexible structure description based on user corrections of detected data fields, title elements, and/or anchor elements.

3. The method of claim 1, wherein the table spans multiple pages of the document, and wherein the title elements repeat on two or more pages of the multiple pages.

4. The method of claim 1, wherein the generating the flexible structure description comprises identifying anchor elements for searching data fields.

5. The method of claim 1, wherein the generating the flexible structure description comprises generating values of search parameters for each element and field.

6. The method of claim 1, wherein the matching the flexible structure description against the image comprises:
matching the title elements on each page of the document;
removing the matched title elements from a search area of the document; and
searching the search area with the matched title elements removed for data fields.

7. The method of claim 1, wherein the entry corresponds to a row of the table that spans multiple lines of the document.

8. The method of claim 1, further comprising receiving at least one entry, wherein the entry comprises multiple cells of the table, and wherein at least two of the multiple cells overlap.

9. A system for creating a flexible structure description, the system comprising:
one or more electronic processors configured to:
receive an image of a document of a particular document type that contains a table;
receive an entry describing an item in the table;
search for title elements based upon the entry;
detect data fields and anchor elements for the entry;
generate a flexible structure description for the particular document type that includes a set of search elements for each data field in the image of the document and the title elements;
match the flexible structure description against the image; and
extract data from the image based upon the matching of the flexible structure description against the image.

10. The system of claim 9, wherein the one or more electronic processors are further configured to adjust the flexible structure description based on user corrections of detected data fields, title elements, and/or anchor elements.

11. The system of claim 9, wherein the table spans multiple pages of the document, and wherein the title elements repeat on two or more pages of the multiple pages.

12. The system of claim 9, wherein to generate a flexible structure description for the particular document type the one or more electronic processors are configured to identify anchor elements for searching data fields.

13. The system of claim 9, wherein to generate a flexible structure description for the particular document type the one or more electronic processors are configured to generate values of search parameters for each element and field.

14. The system of claim 9, wherein to match the flexible structure description against the image comprises the one or more electronic processors are further configured to:
match the title elements on each page of the document;
remove the matched title elements from a search area of the document; and
search the search area with the matched title elements removed for data fields.

15. The system of claim 9, wherein the entry corresponds to a row of the table that spans multiple lines of the document.

16. The system of claim 9, wherein the one or more electronic processors are further configured to receive at least one entry, wherein the entry comprises multiple cells of the table, and wherein at least two of the multiple cells overlap.

17. A non-transitory computer-readable medium having instructions stored thereon to create a flexible structure description, the instructions comprising:
instructions to receive an image of a document of a particular document type that contains a table;
instructions to receive an entry describing an item in the table;
instructions to search for title elements based upon the entry;
instructions to detect data fields and anchor elements for the entry;
instructions to generate a flexible structure description for the particular document type that includes a set of search elements for each data field in the image of the document and the title elements;
instructions to match the flexible structure description against the image; and
instructions to extract data from the image based upon the matching of the flexible structure description against the image.

18. The non-transitory computer-readable medium of claim 17, wherein the instructions further comprise instructions to adjust the flexible structure description based on user corrections of detected data fields, title elements, and/or anchor elements.

19. The non-transitory computer-readable medium of claim 17, wherein the table spans multiple pages of the document, and wherein the title elements repeat on two or more pages of the multiple pages.

20. The non-transitory computer-readable medium of claim 17, wherein the instructions to generate a flexible structure description for the particular document type comprise instructions to identify anchor elements for searching data fields.

* * * * *